Patented Apr. 27, 1948

2,440,601

UNITED STATES PATENT OFFICE 2,440,601

PRODUCTION OF CLAY SUSPENSIONS

Gilbert K. Dickerman, Wisconsin Rapids, Wis., assignor to Consolidated Water Power and Paper Company, Wisconsin Rapids, Wis., a corporation of Wisconsin No Drawing. Application November 14, 1946, Serial No. 709,791

3 Claims. (Cl. 106—308)

This invention relates to the production of pumpable, fluid, high solids content aqueous suspensions of clay, such as kaolin, china clay, Georgia clay, or the like, used in the paper coating art, and which suspensions are resistant to settling on standing and transportation in tank cars, such as from the clay processor to the paper manufacturer.

Heretofore, clay processors have generally shipped the refined clays in freight cars in dry form. The paper manufacturer then made his clay slips or suspensions by dispersing the dry clay in water, and generally with the aid of a deflocculating agent, by means of suitable mechanical mixing devices, such as dough mixers.

It is an advantage to the paper coater to be able to receive the clay in a fluid form in that it greatly simplifies handling at the receiving end and, in addition, there is an improvement in the quality of the clay for coating purposes due to the fact that it has never been dried out, since once it is dried out it is difficult to completely rewet it and some of the properties which make for smooth coating and even finishing are lost.

In conventional practice, the clay processor, after mining the clay, suspends it in water with the aid of a deflocculating agent, such as sodium metasilicate, and first removes therefrom by settling coarse particles, such as sand and similar dense contaminating components. Then other contaminating material, principally mica, not readily removably by settling, is removed by passing the settled slip through a 200-mesh screen. Thereafter, bleaching, settling and centrifuging takes place to obtain proper particle size distribution.

For paper coating purposes, all of the material should pass a 200-mesh screen, that is all of the particles should be of a size less than 60 microns with few particles greater than 10 microns. At least 65 to 70% should be below 2 microns. Subsequent to, or intermediate to these latter steps, the clay is flocculated by the addition of alum or an acid, such as sulfuric acid, so that the clay will settle and permit decanting of a large portion of the clear water, following which the partially concentrated clay's suspension having now a solids content of 18 to 28% is pumped to mechanical filters to be dewatered. For this purpose, filter presses of the non-washing plate-and-frame type are ordinarily used. The advantage in the use of filters is that water can be removed from the slip more economically in this way than by evaporation. However, filtering equipment is limited mechanically to the removal of water only to a point where the clay solids reach a maximum of about 67% and often appreciably less. If it is desired to dry the clay beyond this point, evaporation must be resorted to.

In present general practice the cake from such filter presses, or rotary presses, is broken up and heat dried to a moisture content of 15% or less, generally to a substantially air dry condition, and discharged to either bulk storage, freight cars or bagging equipment. It is also presently known to drum dry such filter cake. For this purpose the cake is first fluidized in a blunger with the aid of a deflocculating agent, such as sodium metasilicate or sodium pyrophosphate, and the putty-like filter cake converted into a free-flowing liquid slip.

In accordance with the present invention, it has been found that similarly deflocculated or fluidized clay slips, upon suitable increase of their solids content, are amendable to bulk shipment in tank cars in pumpable form and in a condition resistant to settling on shipment and storage. That is, although, as indicated, clay filter cake as it leaves the mechanical filters at a solids content of about 67% or less can be fluidized, there is a tendency for the clay particles to settle out on standing during normal transportation from the refiner to the consumer which is further influenced by the normally occurring periods of standing in the tank cars upon arrival at the consumer's plant until orderly withdrawal for use, which generally entails a minimum period of about eight to ten days, to an extent which renders handling of such low solids content clay slips unfeasible and economically undesirable.

However, it has been found, in accordance with the present invention, that if the solids content of such fluid slips is increased to at least 68% and preferably to approximately 70% the slip remains in a fluid pumpable condition with very little, if any, tendency to settle out over such periods of tank car residence. The most efficient solids content range has been found to be from about 69% to about 72%, and depending upon the nature of the clay some slips can be made fluid with as high as about 74% solids, the highest solids content being, of course, most economical from a shipping cost standpoint. At these increased solids contents, the particles have a greatly enhanced resistance to settling out since they are closely packed together.

Thus, for example, in accordance with the present invention clay filter cake is fluidized by conveying it to a blunger similar to one employed for dispersing crude clay. A dry dispersing agent is charged into the blunger with the filter cake to re-deflocculate the clay and at the same time sufficient dry clay, of a moisture content of 15% or less, is added to bring the solids content up to approximately 70%. The dispersing agent may be such compounds as sodium metasilicate, tetrasodium pyrophosphate, sodium hexametaphosphate or the like, and are employed in the proportion of approximately 0.2% by weight of the clay solids. The combined mechanical action and chemical action of the blunger and dispersing agent converts the putty-like filter cake into a free-flowing liquid slip which may then be pumped directly into tank cars. The viscosity of the resulting slip should be in the range of from about 10 to about 100 seconds Stormer, and preferably about 20 seconds as an indication of stability against settling or segregation.

The following are examples of the condition of two tank cars of fluidized clay upon unloading, one after eight days and the other after ten days in transit:

| Car No. | Sample | Specific Gravity | Solids Per Cent |
|---|---|---|---|
| A | Top | 1.742 | 71.3 |
|   | Bottom | 1.773 | 72.7 |
|   | Mixed | 1.760 | 70.5 |
| B | Top | 1.748 | 70.0 |
|   | Bottom | 1.793 | 72.3 |
|   | Mixed | 1.768 | 71.1 |

Settling of the foregoing was confined merely to partial segregation of coarse particles as reflected in increasing density of slip from top to bottom of the cars. The inside of the tanks were probed to detect actual settling with negative results. Discharge was accomplished by employing a pair of plunger pumps, one being employed to circulate the slip from the bottom of the tank to the top while the other pump was connected to pump the clay into the paper coating plant for use.

I claim as my invention:

1. The method of converting refined clay filter cake of less than about 67% solids content to a pumpable aqueous suspension and for enhancing the resistance of the suspended clay particles to settling on standing which comprises dispersing and fluidizing the clay filter cake with the aid of a deflocculating agent together with the addition of relatively dry clay of less than 15% moisture content in an amount sufficient to increase the solids content of the resulting suspension to approximately 70%.

2. The method of converting refined clay filter cake of less than about 67% solids content to a pumpable aqueous suspension and for enhancing the resistance of the suspended clay particles to settling on standing which comprises dispersing and fluidizing the clay filter cake with the aid of a deflocculating agent together with the addition of relatively dry clay of less than 15% moisture content in an amount sufficient to increase the solids content of the resulting suspension to approximately 68-74%.

3. The method of converting refined paper coating clay filter cake of less than about 67% solids content, and wherein at least 65% of the clay particles have a size below 2 microns, to a pumpable slip of enhanced resistance to settling on standing which comprises fluidizing the filter cake with the aid of a dispersing agent and intimately mixing therewith clay of less than 15% moisture content to increase the solids of the resulting clay slip to approximately 68-74%.

GILBERT K. DICKERMAN.

REFERENCES CITED

The following references are of record in the file of this patent:

Flow properties of coating clays at high rates of shear, Arnold, Paper Trade Journal, vol. 117, No. 9, pages 23-24.